(12) United States Patent
Andoh et al.

(10) Patent No.: US 10,323,752 B2
(45) Date of Patent: Jun. 18, 2019

(54) BUTTERFLY VALVE

(71) Applicant: TGK CO., LTD., Tokyo (JP)

(72) Inventors: Toshihiro Andoh, Tokyo (JP); Misaki Satou, Tokyo (JP); Kiyotaka Ueki, Tokyo (JP)

(73) Assignee: TGK CO., LTD., Tokyo (JP)

( * ) Notice: Subject to any disclaimer, the term of this patent is extended or adjusted under 35 U.S.C. 154(b) by 14 days.

(21) Appl. No.: 15/591,849

(22) Filed: May 10, 2017

(65) Prior Publication Data

US 2017/0328477 A1 Nov. 16, 2017

(30) Foreign Application Priority Data

May 13, 2016 (JP) ................................ 2016-096959

(51) Int. Cl.
| | |
|---|---|
| *F16K 1/22* | (2006.01) |
| *F16K 1/226* | (2006.01) |
| *F16K 31/04* | (2006.01) |
| *F16K 11/052* | (2006.01) |
| *B60H 1/00* | (2006.01) |

(52) U.S. Cl.
CPC ....... *F16K 1/2261* (2013.01); *B60H 1/00485* (2013.01); *F16K 1/222* (2013.01); *F16K 11/052* (2013.01); *F16K 11/0525* (2013.01); *F16K 31/04* (2013.01)

(58) Field of Classification Search
CPC ...... F16K 1/222; F16K 1/1226; F16K 1/2261; F16K 11/052; F16K 11/0525; F16K 31/04; F16K 1/2268; B60H 1/00485; F25B 41/04; F25B 41/043; F25B 41/046
See application file for complete search history.

(56) References Cited

U.S. PATENT DOCUMENTS

| | | | | |
|---|---|---|---|---|
| 3,186,682 A | * | 6/1965 | Pierson | F16K 1/2268 251/306 |
| 3,442,489 A | * | 5/1969 | Cary | F16K 1/222 251/305 |
| 3,526,385 A | * | 9/1970 | Rohrer | F16K 1/2261 251/306 |
| 3,784,157 A | * | 1/1974 | Wenglar | F16K 1/2265 137/454.2 |

(Continued)

FOREIGN PATENT DOCUMENTS

| | | | |
|---|---|---|---|
| DE | 103 25 196 B3 | 2/2005 | |
| EP | 1847738 A1 * | 10/2007 | ........... F02D 9/1015 |

(Continued)

*Primary Examiner* — Reinaldo Sanchez-Medina
*Assistant Examiner* — David Colon-Morales
(74) *Attorney, Agent, or Firm* — Muncy, Geissler, Olds & Lowe, P.C.

(57) ABSTRACT

A butterfly valve includes a valve element that turns with a shaft to control open/closed states of a passage or adjust an opening degree of the passage. The valve element includes a plate and an elastic member provided along an outer circumference of the plate. The elastic member has seal parts that touch and leave an inner surface of the passage to close and open the passage. The plate has specific shapes on both sides with respect to an axis of the shaft, the specific shapes narrowing gaps between the plate and the inner surface on lower-pressure sides of seal centers of the seal parts in a valve closed state.

6 Claims, 15 Drawing Sheets

(56) References Cited

U.S. PATENT DOCUMENTS

| | | | | |
|---|---|---|---|---|
| 4,358,086 A * | 11/1982 | Hiltebrand | ............. | B32B 15/04 |
| | | | | 251/306 |
| 4,361,170 A * | 11/1982 | Peloza | ............... | B60H 1/00485 |
| | | | | 137/625.29 |
| 5,669,350 A * | 9/1997 | Altmann | .................. | F02D 9/10 |
| | | | | 123/337 |
| 6,155,296 A * | 12/2000 | Roman | ............. | B60H 1/00485 |
| | | | | 137/625.29 |
| 6,612,542 B2 * | 9/2003 | Hirota | ............... | B60H 1/00485 |
| | | | | 137/870 |
| 6,908,072 B2 * | 6/2005 | Hattori | ................. | F16K 1/2261 |
| | | | | 251/306 |
| 8,714,522 B2 * | 5/2014 | Hasegawa | ........... | F02D 9/1015 |
| | | | | 123/337 |
| 9,121,109 B2 * | 9/2015 | Fache | ................ | F16K 37/0008 |
| 9,217,377 B2 * | 12/2015 | Gerards | ................ | F02D 9/1005 |
| 9,624,838 B2 * | 4/2017 | Oiwa | ................. | F02B 27/0215 |
| 9,995,399 B2 * | 6/2018 | Zhang | .................... | F16K 1/222 |
| 2010/0065763 A1 * | 3/2010 | Suetome | ............ | B29C 45/1459 |
| | | | | 251/129.01 |
| 2014/0151592 A1 * | 6/2014 | Ha | ..................... | F16K 37/0075 |
| | | | | 251/306 |

FOREIGN PATENT DOCUMENTS

| | | |
|---|---|---|
| GB | 1 533 073 A | 11/1978 |
| JP | S60-101367 A | 6/1985 |
| JP | 2000-170926 A | 6/2000 |
| WO | WO 2016/051875 A1 | 4/2016 |

* cited by examiner

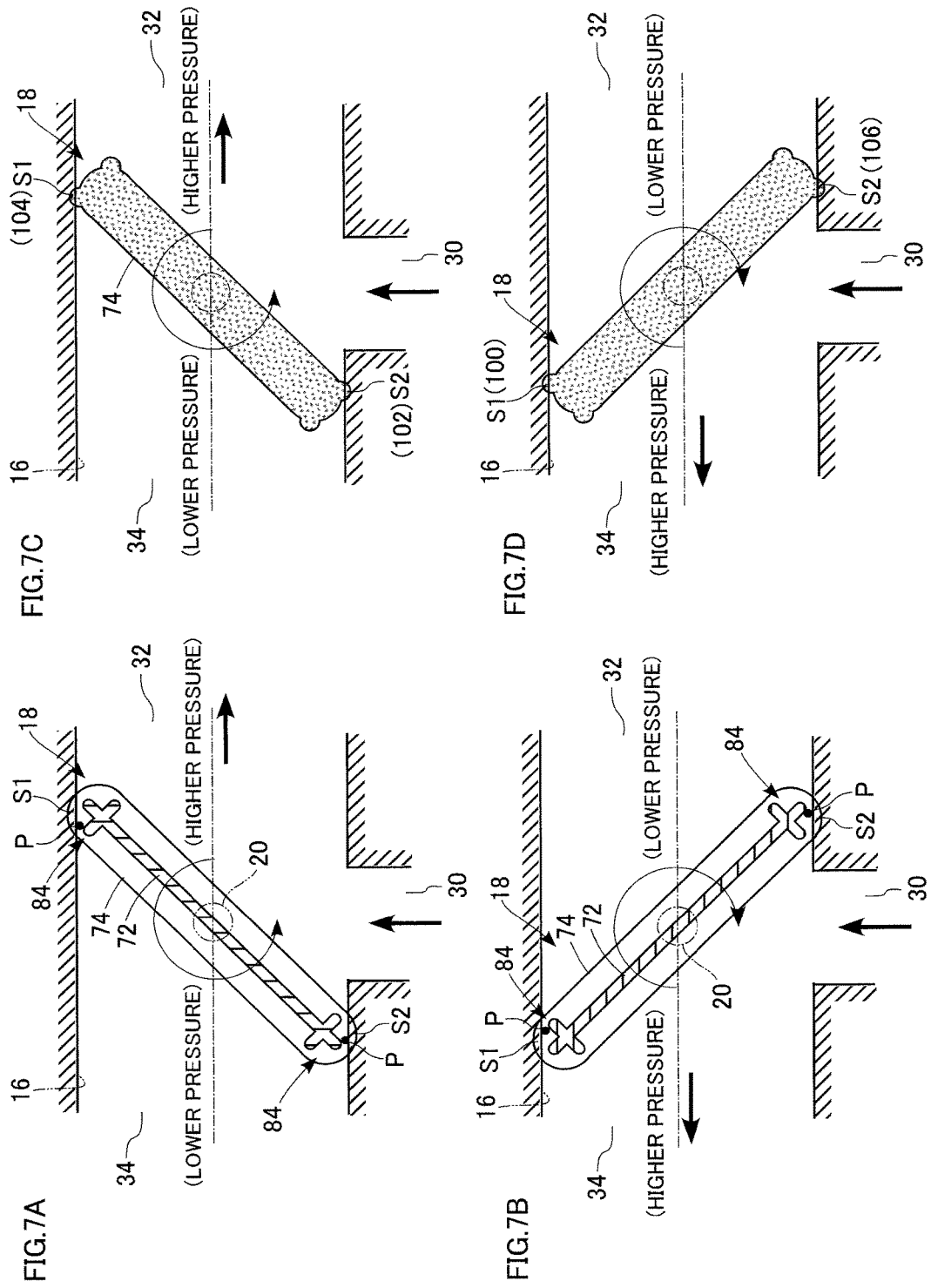

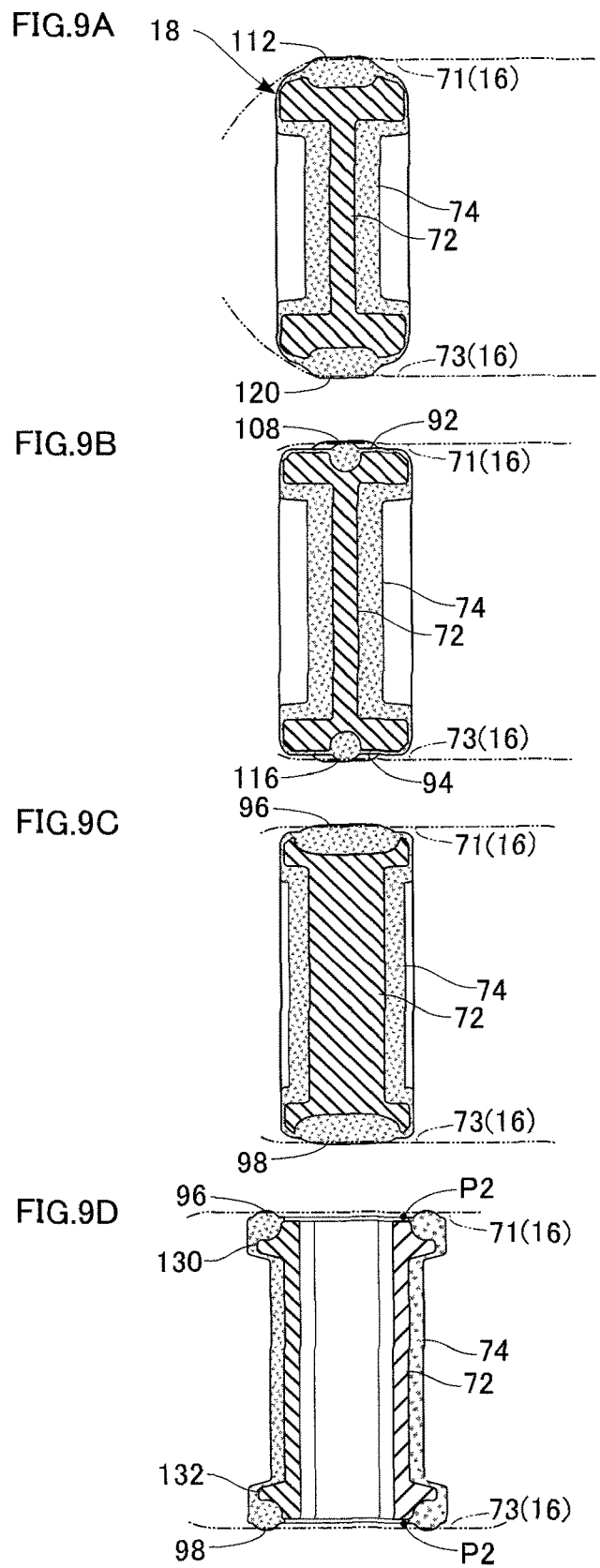

BUTTERFLY VALVE

CLAIM OF PRIORITY

This application claims priority to Japanese Patent Application No. 2016-096959 filed on May 13, 2016, which is incorporated herein by reference.

BACKGROUND OF THE INVENTION

1. Field of the Invention

The present invention relates to a butterfly valve.

2. Description of the Related Art

A butterfly valve has a simple structure in which a disk-shaped valve element is mounted on a shaft, which can be produced at relatively low cost. Butterfly valve are therefore often installed in water circuits of water heaters and the like and used for opening/closing or switching fluid passages (refer, for example, to Japanese Patent Application Publication No. 2000-170926). Such a butterfly valve has a valve element produced by covering a metal plate with an elastic member, for example. The valve element is turned such that an outer circumferential portion of the valve element is pressed against an inner surface of a passage, which achieves sealing while the valve is in a closed state.

RELATED ART LIST (1) Japanese Patent Application Publication No. 2000-170926

In the butterfly valve, a differential pressure between a high-pressure side and a low-pressure side acts on the valve element while the butterfly valve is in the closed state. The differential pressure acts in a closing direction on a sealed part on one side of a rotational axis of the valve element and acts in an opening direction on a sealed part on the other side of the rotational axis, as will be described below. Thus, when the butterfly valve is applied to a device with high-pressure fluid such as a refrigeration cycle, in particular, sufficient sealing performance may not be achieved.

SUMMARY OF THE INVENTION

One purpose of an embodiment of the present invention is to increase sealing performance of a butterfly valve while the butterfly valve is in a closed state.

One embodiment of the present invention relates to a motor-operated butterfly valve. The butterfly valve includes: a body having a passage through which a fluid passes; a shaft supported by the body such that the shaft is rotatable about its axis, and extending in a radial direction of the passage; a valve element disposed in the passage in a state where the valve element and the shaft are assembled, and configured to turn with the shaft to control open/closed states of the passage or adjust an opening degree of the passage; and an actuator configured to drive the shaft to rotate when power is supplied.

The valve element includes a plate, and an elastic member provided along an outer circumference of the plate. The elastic member has seal parts that touch and leave an inner surface of the passage to close and open the passage. The plate has specific shapes on both sides with respect to an axis of the shaft, the specific shapes narrowing gaps between the plate and the inner surface of the passage on lower-pressure sides of seal centers of the seal parts in a valve closed state.

In this embodiment, no elastic material is provided on the passage side, but the elastic member is provided along the outer circumference of the plate of the valve element. In particular, the plate has the specific shapes, so that the gaps between the inner surface of the passage and the plate on the lower-pressure sides of the seal centers are narrowed while the valve is closed. This allows the gaps to function as resistance restricting displacement of the seal parts even when a differential pressure acts on part of the seal parts while the valve is closed. In this case, the elastic member being pressed toward the narrow gaps between the passage and the plate against the resistance, also increases surface pressure of the seal part on which a differential pressure in a valve opening direction acts, which allows the valve element to exert a self-sealing effect. According to this embodiment, the sealing performance of the butterfly valve while the valve is closed is increased.

BRIEF DESCRIPTION OF THE DRAWINGS

FIGS. 7A to 7D schematically illustrate a principle of a sealing method;

FIGS. 9A to 9D illustrate specific structures to achieve the sealing method of FIGS. 7A to 7D;

DETAILED DESCRIPTION OF THE INVENTION

Figure 1A:
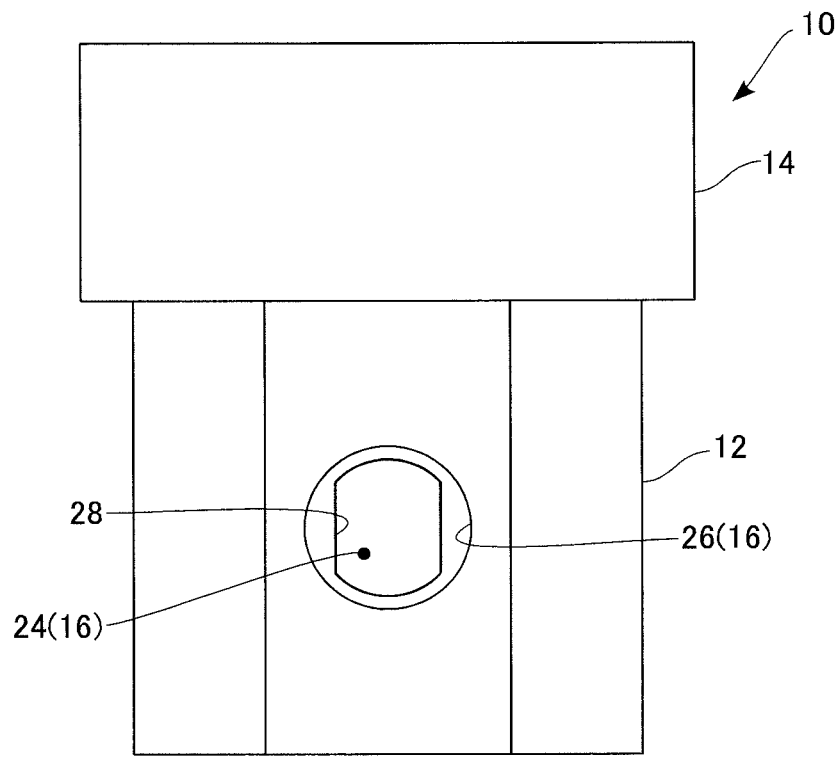
FIGS. 1A and 1B illustrate a structure of a butterfly valve according to a first embodiment.

Certain embodiments of the invention will now be described. The description does not intend to limit the scope of the present invention, but to exemplify the invention.

Embodiments of the present invention will now be described in detail with reference to the drawings. In the description below, for convenience of description, the positional relationship in each structure may be expressed with reference to how the structure is depicted in the drawings.

First Embodiment

In the present embodiment, a butterfly valve is a switching valve applicable to a refrigeration cycle of an automotive air conditioner. The automotive air conditioner includes a refrigeration cycle in which a compressor, a condenser, an expander, an evaporator, and other components, which are not illustrated, are connected by piping. Refrigerant circulates in the refrigeration cycle while changing its state, for air conditioning in the vehicle interior. Examples of the refrigerant include HFC-134a and HFO-1234yf. The butterfly valve is installed at a predetermined position in the refrigeration cycle, and functions as a refrigerant three-way valve capable of switching between passages.

Figure 1B:
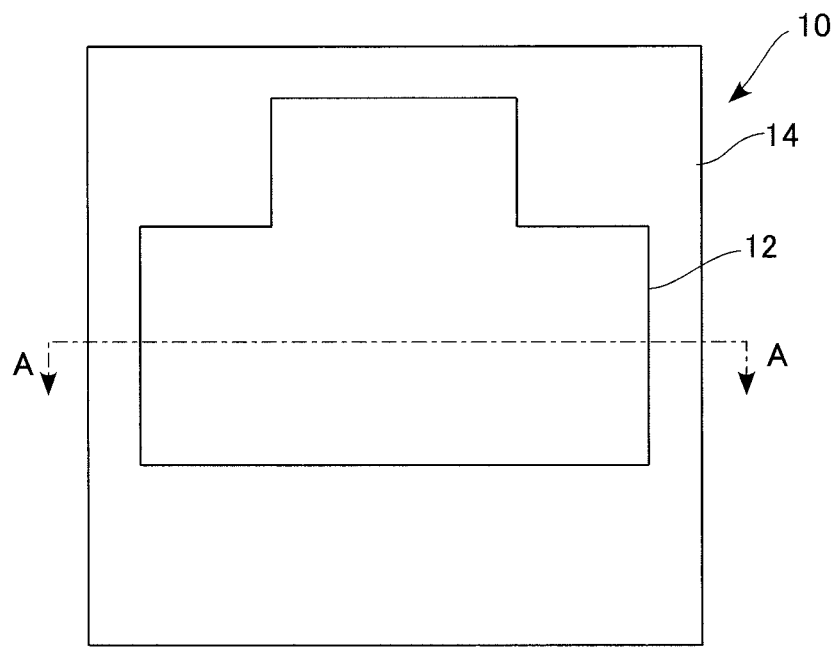
Figure 2A:
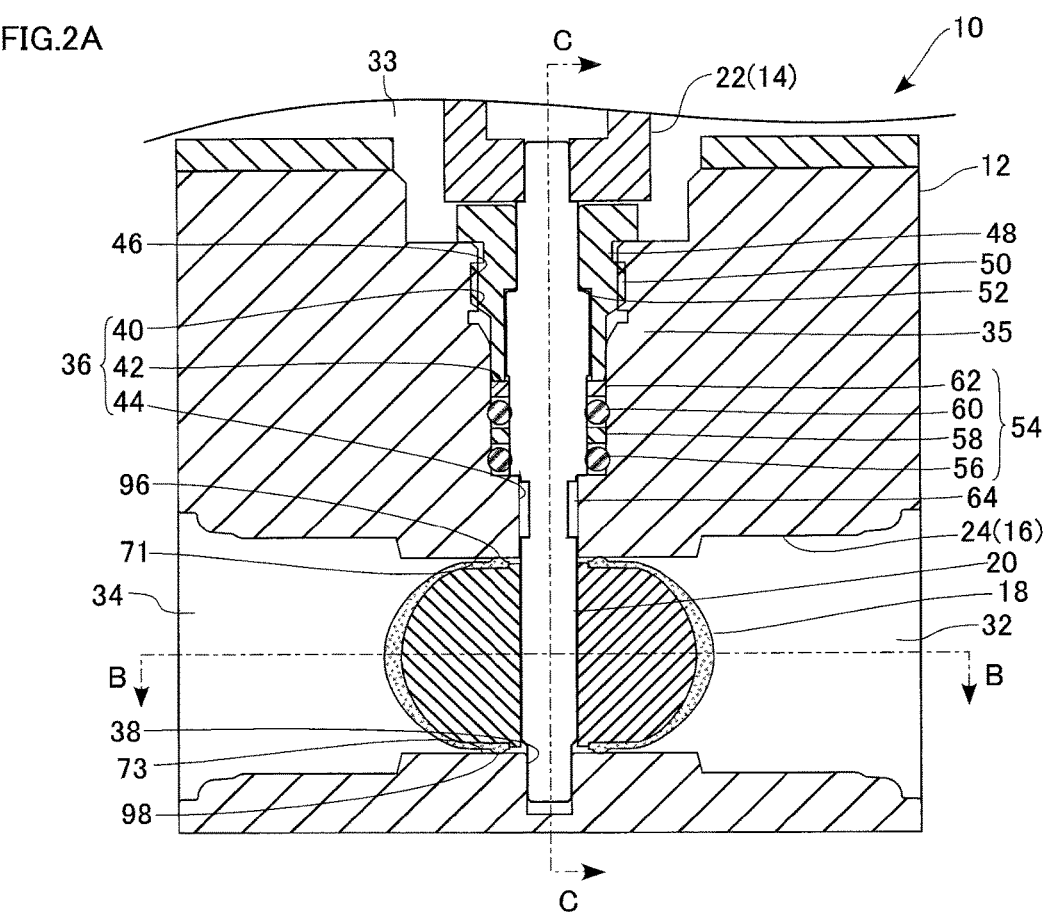
FIGS. 2A and 2B illustrate a structure of the butterfly valve according to the first embodiment.
Figure 2B:
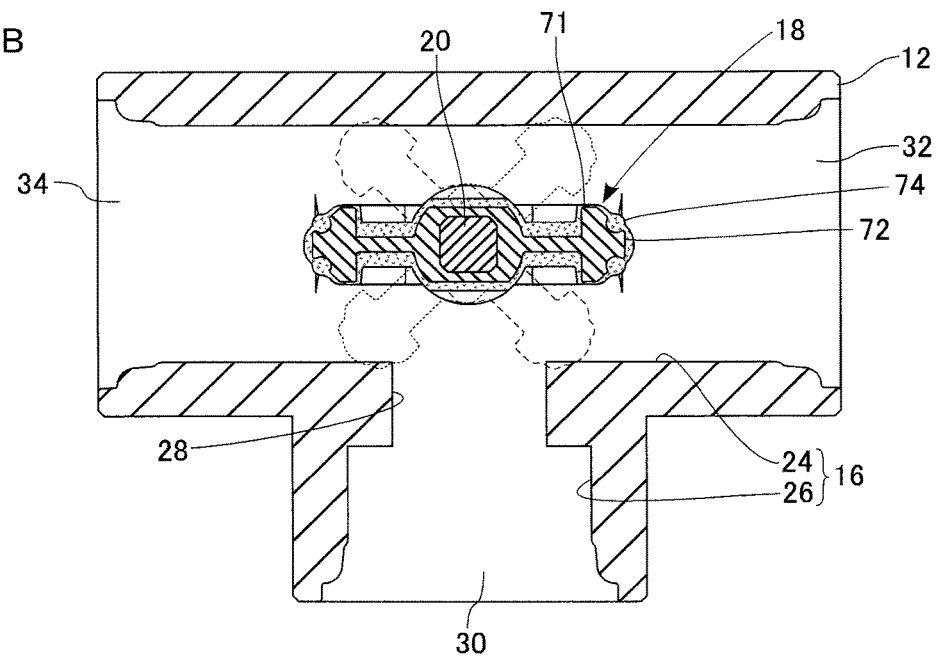
Figure 3:
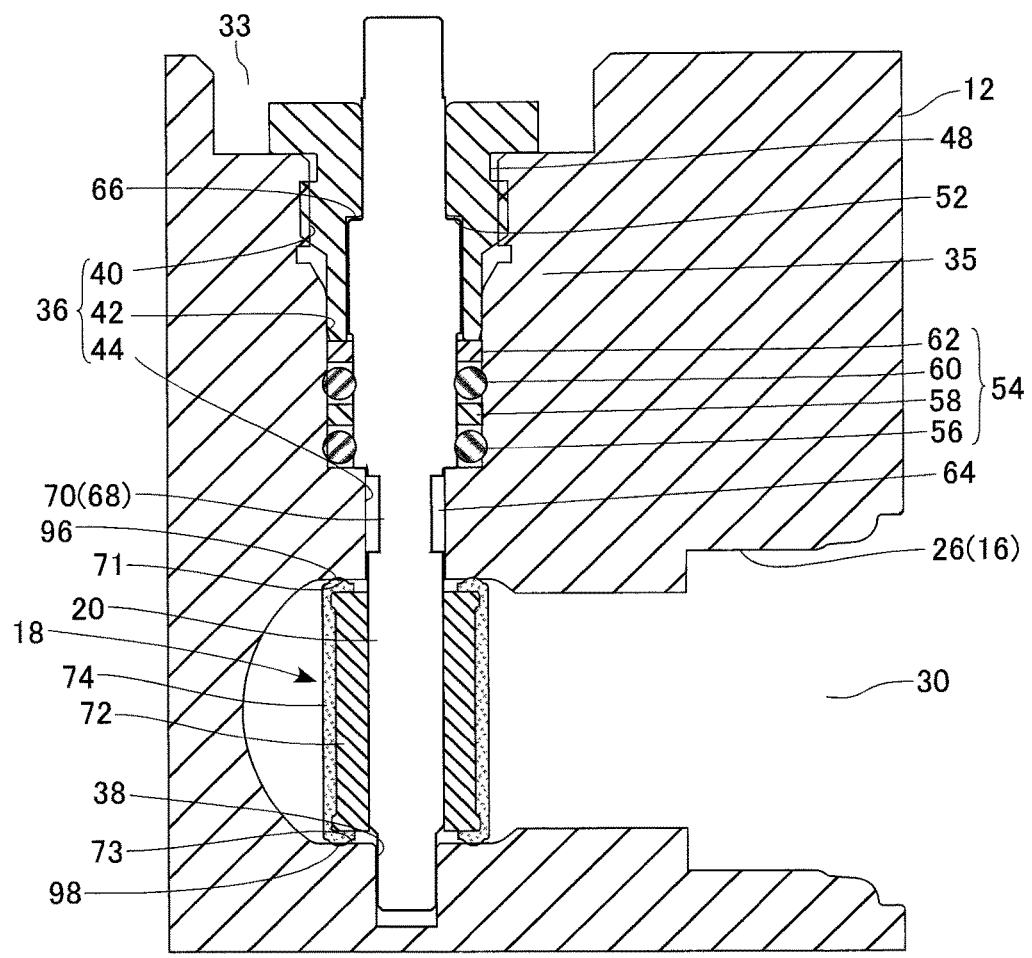
FIG. 3 illustrates a structure of the butterfly valve according to the first embodiment.

FIGS. 1A to 3 illustrate a structure of the butterfly valve according to the first embodiment. FIG. 1A in a front view, and FIG. 1B is a bottom view. FIG. 2A is a cross-sectional view along arrows A-A in FIG. 1B, and FIG. 2B is a cross-sectional view along arrows B-B in FIG. 2A. FIG. 3 is a cross-sectional view along arrows C-C in FIG. 2A.

As illustrated in FIGS. 1A and 1B, the butterfly valve 10 includes a body 12 containing a valve section and an actuator 14 for driving the valve section, which are integrally assembled. Examples of the actuator 14 include a DC motor, a stepping motor, and other motor-operated actuators, details of which will be omitted in the description.

As illustrated in FIG. 2A, the butterfly valve has a valve element 18 contained in the body 12 and capable of controlling open/closed states of a refrigerant passage 16 (capable of switching between passages), and a shaft 20, which is the center of rotation of the valve element 18. The shaft 20 is connected to a rotation mechanism 22 (rotating shaft) of the actuator 14. The body is produced through cutting or the like of a metal material such as an aluminum alloy or brass.

As also illustrated in FIG. 2B, the body 12 has a T-shaped cross section, and the passage 16 is a T-shaped passage. Specifically, the passage 16 has a straight first passages 24 extending through the body 12, and a second passage 26 connected perpendicularly to the first passage 24. An inlet port 30 through which the refrigerant is introduced from the upstream side is formed at one end of the second passage 26. A first outlet port 32 and a second outlet port 34 are formed at one end and the other end, respectively, of the first passage 24. The valve element 18 is positioned in the first passage 24 at a point of connection with the second passage 26. The refrigerant introduced through the inlet port 30 can be delivered to the downstream side through the first outlet port 32 or the second outlet port 34 depending on the turning position of the valve element 18.

The body 12 has a partition 35 separating a working chamber 33, where the mechanism of the actuator 14 is located, from the passage 16. An insertion hole 36 through which the shaft 20 is inserted is formed through the partition 35. The body 12 also has a shaft support hole 38 opposed to the insertion hole 36 with the passage 16 therebetween. The shaft support hole 38 and the insertion hole 36 are formed coaxially. The shaft support hole 38 supports a lower end part of the shaft 20. Specifically, the shaft 20 extends across the passage 16 in the radial direction, and is supported by the body 12 in such a manner as to be rotatable about its axis.

The insertion hole 36 is a stepped hole having a plurality of steps with the diameter decreasing from an upper part toward a lower part. The insertion hole 36 has a large-diameter part 40, a medium-diameter part 42, and a small-diameter part 44, which are continuous in this order from the upper part. The large-diameter part 40 has an internal thread portion 46. A shaft support member 48 having a stepped cylindrical shape is fixed to an upper half part of the insertion hole 36. The shaft 20 is supported by the shaft support member 48 and the shaft support hole 38 in such a manner as to be rotatable about the axis. The shaft support member 48 has an external thread portion 50 formed in an upper half part thereof. The external thread portion is engaged with the internal thread portion 46 and fastened, so that the shaft support member 48 is fixed to the body 12. A lower half part of the shaft support member 48 is inserted in the medium-diameter part 42. The shaft support member 48 has a stepped circular hole therein, and a step 52 of the shaft support member 48 functions as a stopper restricting upward displacement of the shaft 20.

A lower half part of the medium-diameter part 42 is provided with a shaft sealing member 54 having O rings and back-up rings arranged alternately. Specifically, the shaft sealing member 54 has an O ring 56, a back-up ring 58, an O ring 60, and a back-up ring 62 in this order from the bottom. The shaft sealing member 54 is provided between a bottom surface of the medium-diameter part 42 and a bottom surface of the shaft support member 48. In particular, the O rings 56 and 60 are provided between the medium-diameter part 42 and the shaft 20, which restricts leakage of the refrigerant from the passage 16 side to the working chamber 33 side. Oil is sealed in a clearance space 64 between the shaft sealing member 54 and the valve element 18. The oil has a function of increasing sealing performance in cooperation with the shaft sealing member 54.

As also illustrated in FIG. 3, the shaft 20 has a stepped columnar shape. The shaft 20 and the valve element 18 are assembled in such a manner that a lower half part of the shaft 20 extends through the valve element 18. The diameter of an upper half part of the shaft 20 decreases in a stepwise manner such that a step 66 of the shaft 20 is stoppable by the step 52 of the shaft support member 48. The shaft 20 has a recess 68 around an outer surface of a part thereof positioned in the small-diameter part 44. This part is referred to as a reduced-diameter part 70. The oil is sealed in the clearance space 64 surrounded by the reduced-diameter part 70 and the small-diameter part 44 to prevent or minimize flow of the refrigerant toward the shaft sealing member 54 side.

The valve element 18 is not fixed to the shaft in the axial direction, but is restricted in movement along the axial direction by an inner surface of the passage 16. Specifically, the inner surface of the passage 16 has a pair of flat surfaces 71 and 73, formed by cutting, at positions facing an upper end face and a lower end face of the valve element 18. The flat surfaces 71 and 73 restrict the movement of the valve element 18 along the axial direction. The cutting of the flat surfaces can be processing with a machining center, an internal broach, or the like.

When the valve element 18 turns about 45 degrees from the state shown in FIG. 2B, the outer circumference of the valve element 18 comes in contact with the inner surface of the passage 16. This closes a passage on the first outlet port 32 side or a passage on the second outlet port side, and provides sealing in the closed state (valve closed state). Specifically, the valve element 18 is turnable in one direction (the counterclockwise direction in FIG. 2B) and or in the other direction (the clockwise direction in FIG. 2B) from the state along the axis of the passage 16 (see dotted lines and broken lines in FIG. 2B), and the turning of the valve element 18 is driven by the actuator 14.

Turning of the valve element 18 in one direction closes a second passage (the state shown by dotted lines in FIG. 2B) to open a first passage connecting the inlet port 30 with the first outlet port 32 and close (block) a second passage connecting the inlet port 30 with the second outlet port 34. Turning of the valve element 18 in the other direction closes a first passage (the state shown by broken lines in FIG. 2B)

to open the second passage and close (block) the first passage. In the present embodiment, when the second passage or the first passage is opened or closed, the valve element 18 touches or leaves the inner surface of the first passage 24 at an angle smaller than 90 degrees with respect to the axis of the first passage 24.

Figure 4A:
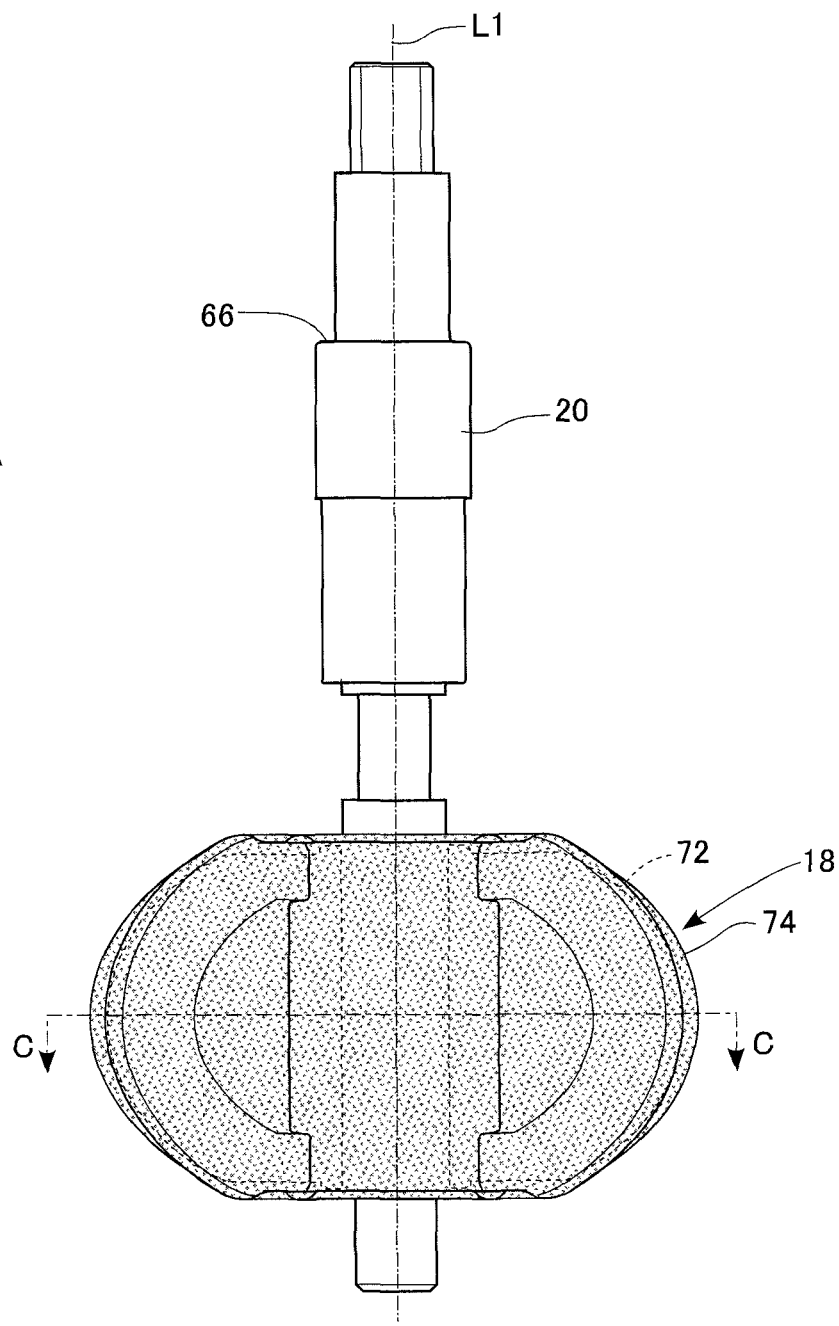
FIGS. 4A and 4B illustrate a valve element and a structure around the valve element.
Figure 4B:
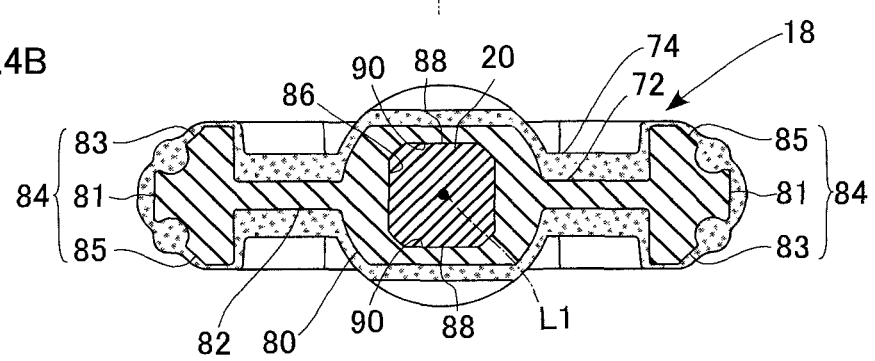
Figure 5A:
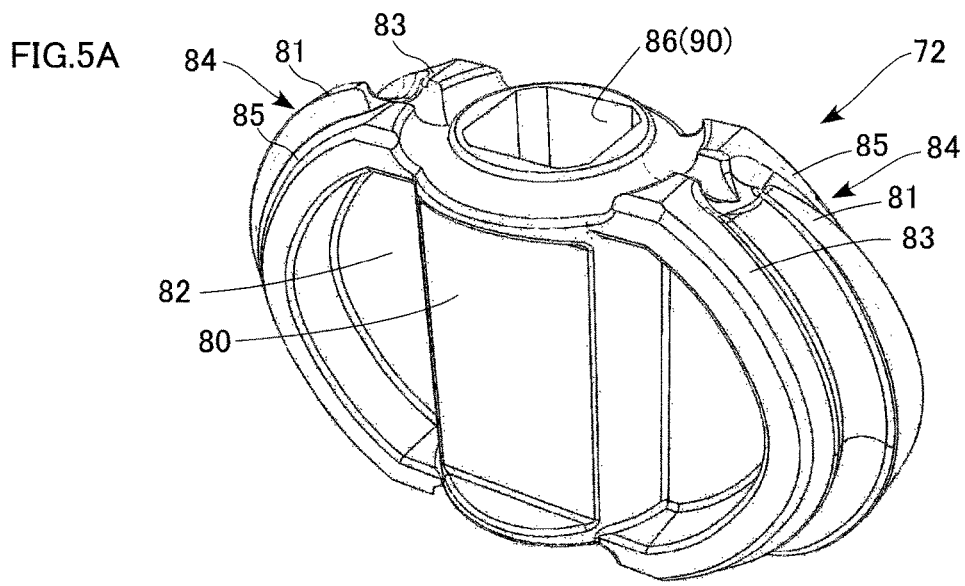
FIGS. 5A to 5C illustrate the valve element a structure around the valve element.
Figure 5B:
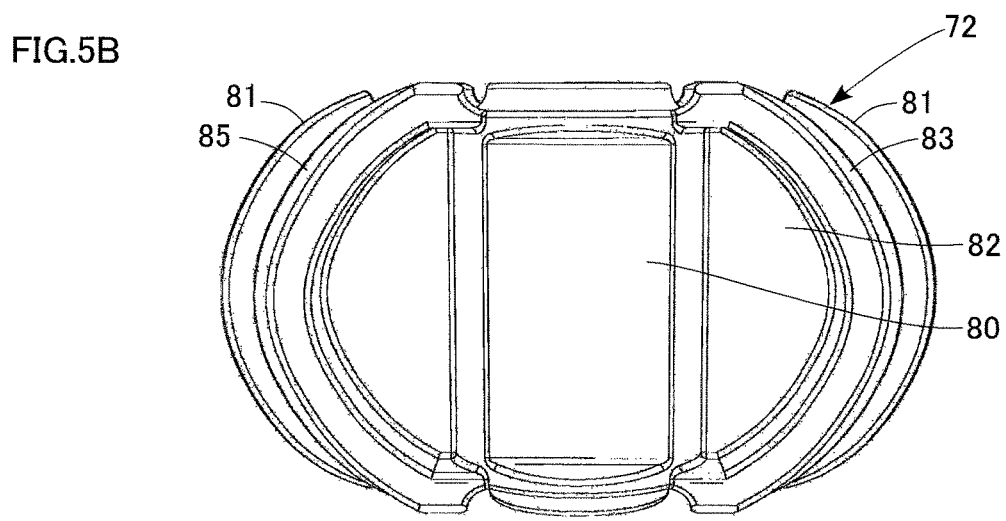
Figure 5C:
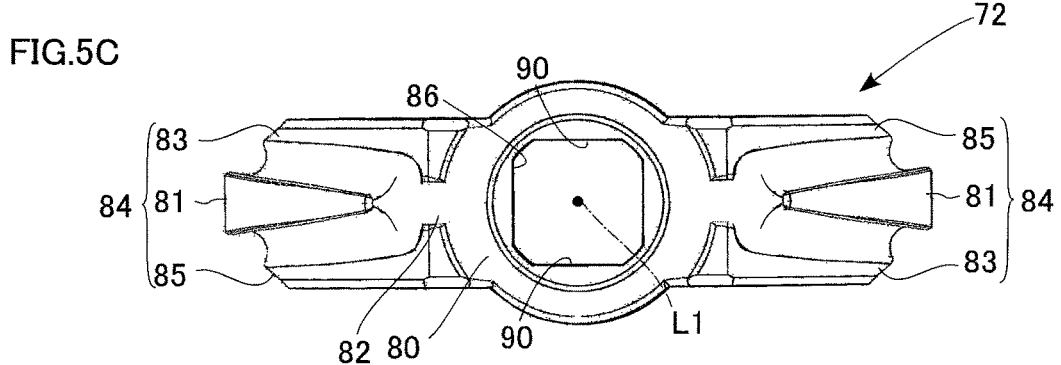
Figure 6A:
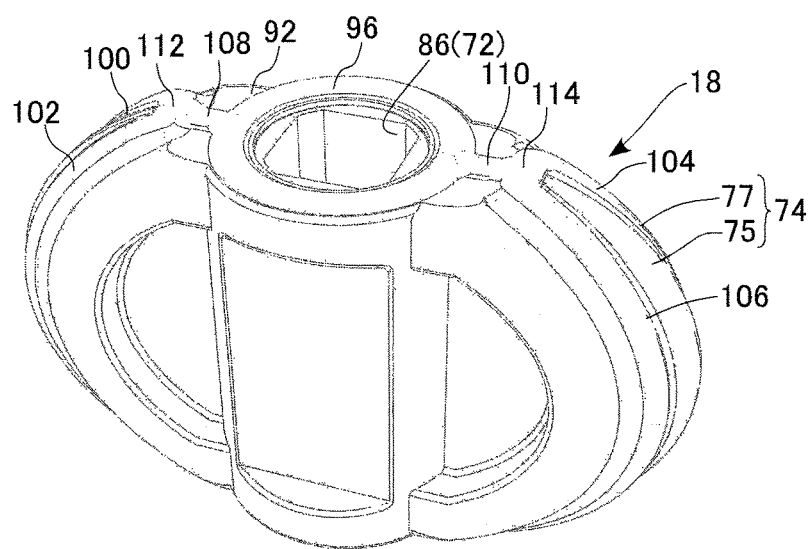
FIGS. 6A to 6C illustrate the valve element and a structure around the valve element.
Figure 6B:
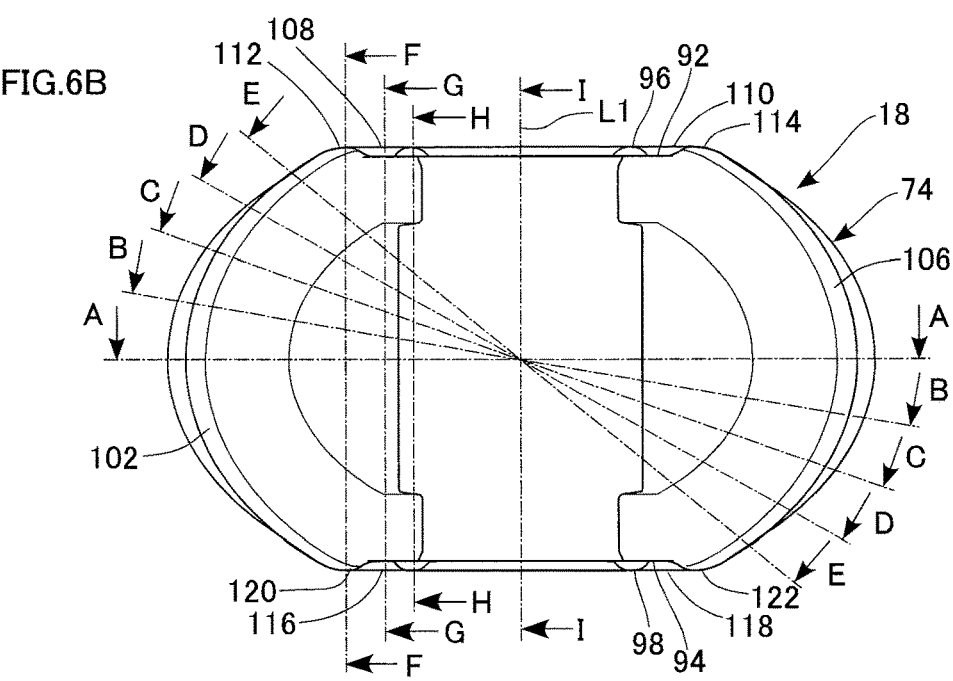
Figure 6C:
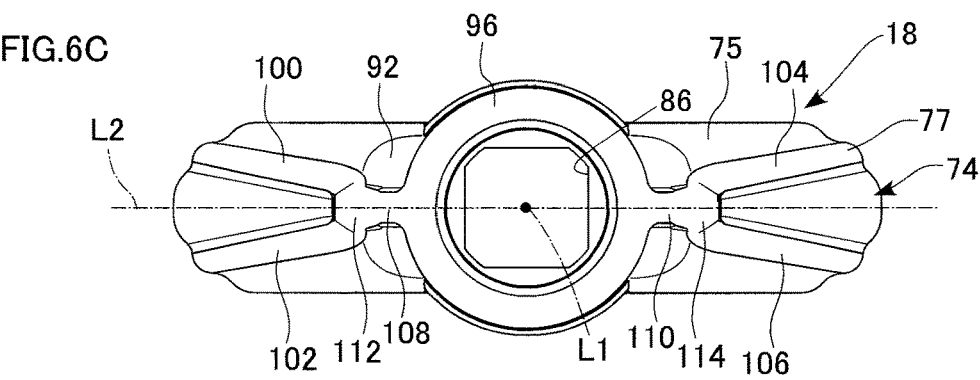
Figure 8A:
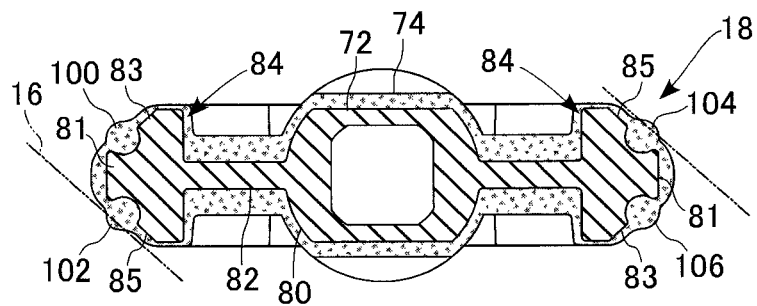
FIGS. 8A to 8E illustrate specific structures to achieve the sealing method of FIGS. 7A to 7D.
Figure 8B:
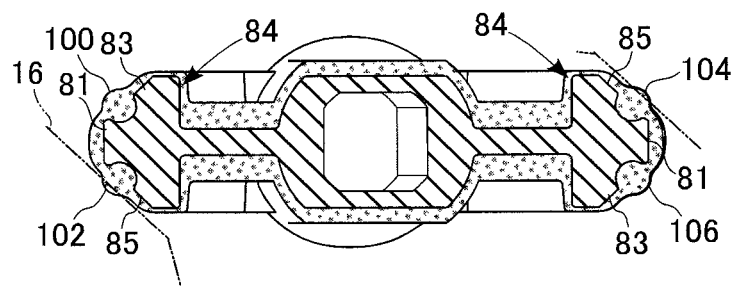
Figure 8C:
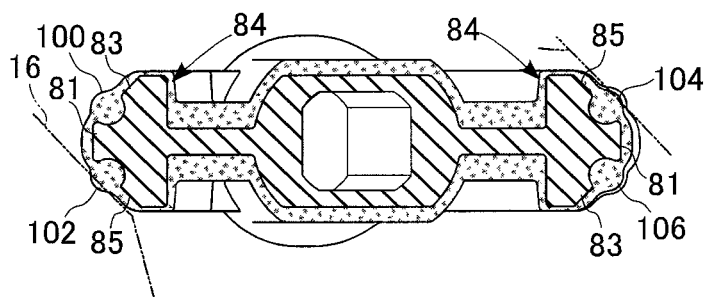
Figure 8D:
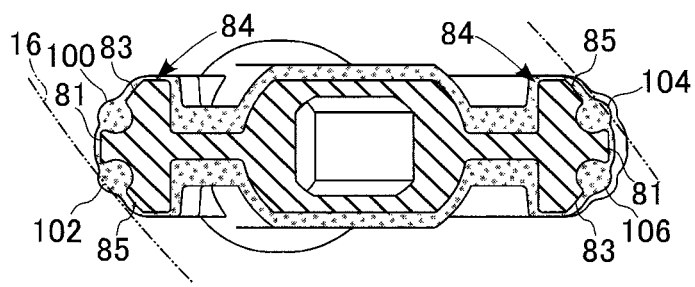
Figure 8E:
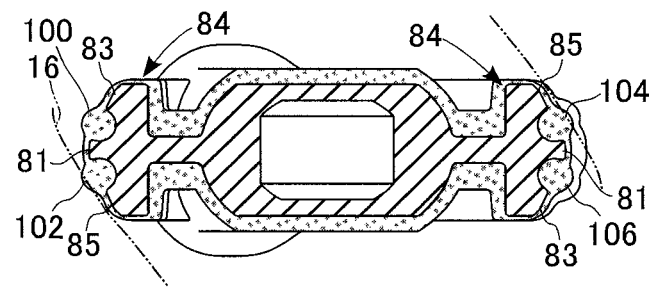

Next, the structure of the valve element 18 will be described in detail. FIG. 4A to 6C illustrate the valve element 18 and a structure around the valve element 18. FIG. 4A is a front view illustrating a structure of connection between the valve element 18 and the shaft 20, and FIG. 4B is a cross-sectional view along arrows C-C in FIG. 4A. FIGS. 5A to 5O illustrate external views of a plate of the valve element 18. FIG. 5A is a perspective view, FIG. 5B is a front view, and FIG. 5C is a plan view. FIGS. 6A to 6C illustrate external views of the valve element 18. FIG. 6A is a perspective view, FIG. 6B is a front view, and FIG. 6C is a plan view.

As illustrated in FIGS. 4A and 4B, the valve element 18 includes a metal plate 72 and an elastic member covering an outer surface of the plate 72, and has a symmetric structure with respect to an axis L1. As also illustrated in FIGS. 5A to 5C, the plate 72 has an oval shape in front view, and includes a cylindrical base 80 through which the shaft 20 extends, plate-shaped valve element body parts 82 extending radially outward from the base 80, and seal support parts 84 formed along an outer circumference of the valve element body parts 82. The base has a mounting hole 86 through which the shaft 20 is inserted. As illustrated in FIG. 4B, the seal support parts 84 each have a trifurcated shape in cross section, and each include a first support part 81 extending in the extending direction of the valve element body part 82, a second support part 83 extending in one turning direction of the valve element 18 from the valve element body part 82, and a third support part 85 extending in the other turning direction of the valve element 18 from the valve element body part 82. The second support part 83 and the third support part 85 extend in directions opposite to each other in the cross section of the valve element body part 82 along the radial direction, and the respective angles between the first support part 81 and the second and third support parts 83 and 85 are about 90 degrees.

In the process of manufacturing the valve element 18, the elastic member 74 (a corrosion-resistant plastic material) is baked onto the plate 72. In the present embodiment, rubber is used for the elastic member 74, and the rubber and the plate 72 are subjected to vulcanization adhesion. In this manner, the elastic member 74 is stably fixed to the plate 72 in close contact with the plate 72.

As illustrated in FIG. 4A, the shaft 20 has a stepped columnar shape as a whole, but is subjected to so-called D-cuts (D-shaped cuts) at a part that is inserted through the valve element 18. Thus, the shaft 20 has a pair of flat surfaces formed at the part inserted in the mounting hole 86, which constitute rotational force transmitting surfaces 88 for transmitting the rotational force of the actuator 14.

An inner wall surface of the base 80 has a pair of pressure receiving surfaces 90 respectively in contact with the pair of rotational force transmitting surfaces 88. When the actuator 14 drives the shaft 20 to rotate the shaft 20, the rotational force transmitting surfaces 88 press the pressure receiving surfaces 90 to apply rotational torque to the plate 72. The valve element 18 turns in a direction associated with the rotating direction of the actuator 14 to switch the passage 16.

As illustrated in FIGS. 6A to 6C, the valve element 18 is vertically and horizontally symmetric in plan view. The elastic member 74 has a base part 75 smoothly covering the entire outer surface of the plate 72, and a band-like seal part 77 protruding from the base part 75 and continuing along the outer circumferential surface of the valve element 18. An upper end face and a lower end face of the elastic member 74 are flat surfaces 92 and 94 perpendicular to the axis and parallel to each other. An annular bead 96 having a circular shape is formed to protrude from the flat surface 92 and surround an upper end opening of the mounting hole 86. The annular bead 96 functions as a "first annular seal part" coaxially surrounding an opening of the insertion hole 36 and being in close contact with the flat surface 71 of the passage 16, to block flow of refrigerant to the inside of the valve element (see FIG. 2A). An annular bead 98 having a circular shape is formed to protrude from the flat surface 94 and surround a lower end opening of the mounting hole 86. The annular bead 98 functions as a "second annular seal part" coaxially surrounding an opening of the shaft support hole 38 and being in close contact with the flat surface 73 of the passage 16, to block flow of refrigerant to the inside of the valve element 18 (see FIG. 2A).

In addition, beads 100, 102, 104, and 106 having an arc shape along the outer circumferential surface of the elastic member 74 are formed to protrude from the outer circumferential surface. The beads 100 and 102 are formed on one side of the valve element 18 with respect to the axis L1, and the beads 104 and 106 are formed on the other side of the valve element 18. In addition, a pair of straight beads 108 and 110 are formed on an upper surface of the elastic member 74 in such a manner as to extend radially outward from the annular bead 96. Furthermore, arc-shaped beads 112 and 114 are formed to orthogonally intersect the ends of the straight beads 108 and 110. An upper end of the bead 100 is continuous with one end of the arc-shaped bead 112, and an upper end of the bead 102 is continuous with the other end of the arc-shaped bead 112. An upper end of the bead 104 is continuous with one end of the arc-shaped bead 114, and an upper end of the bead 106 is continuous with the other end of the arc-shaped bead 114.

Similarly, a pair of straight beads 116 and 118 are formed on a lower surface of the elastic member 74 in such a manner as to extend radially outward from the annular bead 98. Furthermore, arc-shaped beads 120 and 122 are formed to orthogonally intersect the ends of the straight beads 116 and 118. A lower end of the bead 100 is continuous with one end of the arc-shaped bead 120, and a lower end of the bead 102 is continuous with the other end of the arc-shaped bead 120. A lower end of the bead 104 is continuous with one end of the arc-shaped bead 122, and a lower end of the bead 106 is continuous with the other end of the arc-shaped bead 122.

The arc-shaped beads 112 and 114 and the annular bead 96 are concentric. Similarly, the arc-shaped beads 120 and 122 and the annular bead 98 are concentric. Note that the term "concentric" used herein means that the arc-shaped beads preferably have circular arc shapes, but may alternatively have straight shapes (shapes extending in a tangential direction of a concentric circle of an annular seal part) when the arc-shaped beads are short as illustrated. Such straight shapes can be virtually included in the concept of "concentric."

The annular bead 96, the straight beads 108 and 110, and the arc-shaped beads 112 and 114 are in close contact with the flat surface 71 of the passage 16 substantially at the same squeeze rate whether the valve section is open or closed. The arc-shaped beads 112 and 114 are in contact with the flat surface 71 at outermost positions of the elastic member 74 in the radial direction from the axis L1. Similarly, the annular bead 98, the straight beads 116 and 118, and the arc-shaped beads 120 and 122 are also in close contact with the flat surface 73 of the passage 16 at substantially the same squeeze rate whether the valve section is open or closed. The arc-shaped beads 120 and 122 are in contact with the flat surface 73 at outermost positions of the elastic member 74 in the radial direction from the axis L1.

The beads 102 and 104 function as a "first bead part" to open and close the second passage, and the beads 100 and 106 function as a "second bead part" to open and close the first passage. The annular bead 96 functions as the "first annular seal part," and the annular bead 98 functions as the "second annular seal part." The arc-shaped beads 112 and 114 function as a "first seal connection part," and the straight beads 108 and 110 function as a "second seal connection part." The arc-shaped beads 120 and 122 function as a "third seal connection part," and the straight beads 116 and 118 function as a "fourth seal connection part. The beads each have a semicircular cross-section.

When the second passage is closed, the beads 102 and 104 come into close contact with the inner surface of the passage 16. At this point, the beads 102 and 104 are strongly compressed against the inner surface of the passage 16, which provides sufficient sealing performance. Specifically, a continuous sealing structure as follows is achieved: the annular bead 96→the straight bead 108→the arc-shaped bead 112→the bead 102→the arc-shaped bead 120→the straight bead 116→the annular bead 98→the straight bead 118→the arc-shaped bead 122→the bead 104→the arc-shaped bead 114→the straight bead 110→the annular bead 96. This reliably blocks flow of refrigerant through the second passage. At this point, the beads 100 and 106 are not in contact with the inner surface of the passage 16 (see the dotted lines in FIG. 2B).

In contrast, when the first passage is closed, the beads 100 and 106 come into close contact with the inner surface of the passage 16. At this point, the beads 100 and 106 are strongly compressed against the inner surface of the passage 16, which provides sufficient sealing performance. Specifically, a continuous sealing structure as follows is achieved: the annular bead 96→the straight bead 108→the arc-shaped bead 112→the bead 100→the arc-shaped bead 120→the straight bead 116→the annular bead 98→the straight bead 118→the arc-shaped bead 122→the bead 106→the arc-shaped bead 114→the straight bead 110→the annular bead 96. This reliably blocks flow of refrigerant through the first passage. At this point, the beads 102 and 104 are not in contact with the inner surface of the passage 16 (see the broken lines in FIG. 2B).

Next, sealing structures and a sealing method of the present embodiment will be described in detail.

FIGS. 7A to 7D schematically illustrate a principle of the sealing method. FIGS. 7A and 7B illustrate a structure for improving the sealing performance of the valve element. FIGS. 7C and 7D illustrate a structure for reducing shut-off torque of the valve element in the valve closed state. FIGS. 8A to 9D illustrate specific structures to achieve the sealing method of FIGS. 7A to 7D. FIGS. 8A to 8E illustrate cross sections along arrows A-A to E-E, respectively, in FIG. 6B. FIGS. 9A to 9D illustrate cross sections along arrows F-F to I-I, respectively, in FIG. 6B.

In the present embodiment, sufficient sealing performance when the valve element 18 is under high-pressure fluid (improvement in the sealing performance) and suppression of shut-off torque while the valve is closed (torque reduction) are achieved at the same time. In terms of improvement of the sealing performance, the plate 72 has specific shapes to narrow the gaps between the plate 72 and the inner surface of the passage 16 on the lower-pressure sides relative to seal centers of seal parts in the valve closed state, as illustrated in FIGS. 7A and 7B. Specifically, as described above, the seal support parts 84 each have a trifurcated shape. Note that the "seal parts" used herein refer to parts of the elastic member 74 pressed against the passage 16 and elastically deformed (parts squeezed) when the valve is closed. The "seal centers" refer to portions of the seal parts where maximum sealing surface pressure is generated.

As illustrated in FIG. 7A, when the second passage is closed, and the first outlet port 32 side has thus become higher in pressure while the second outlet port side has become lower in pressure, a differential pressure in a self-opening direction acts on a seal part S1 farther than the shaft 20 from the inlet port 30 while a differential pressure in a self-closing direction acts on a seal part S2 closer than the shaft 20 from the inlet port 30. Under such a condition as well, since a narrow region P is formed on a lower-pressure side of the seal center of the seal part S1, the gap at the narrow region P functions as a resistance restricting displacement of the seal part S1. In this case, the seal part S1 being pressed toward the gap against the resistance increases its surface pressure, which allows the seal part S1 to exert a self-sealing effect.

As illustrated in FIG. 7B, when the first passage is closed, and the second outlet port 34 side has thus become higher in pressure while the first outlet port side has become lower in pressure, a differential pressure in a self-opening direction acts on the seal part S1 while a differential pressure in a self-closing direction acts on the seal part S2. Under such a condition as well, a narrow region P is formed on a lower pressure side of the seal center of the seal part S1, which restricts displacement of the seal part S1. Thus, the seal part S1 subjected to the self-opening pressure also increases its surface pressure, which allows the seal part S1 to exert the self-sealing effect. As described above, the sealing performance is increased in both cases where the second passage is closed and where the first passage is closed.

Furthermore, as illustrated in FIGS. 7C and 7D, in terms of torque reduction, the elastic member 74 has bead parts (the beads 100 to 106) protruding from the plate 72 side toward the inner surface of the passage 16 such that the elastic member 74 can come into close contact with the inner surface of the passage 16 while the valve is closed. In the valve closed state, the bead parts constitute the seal parts S1 and S2.

As illustrated in FIG. 7C, when the second passage is closed, the bead 104 serves as the seal part S1 and the bead 102 serves as the seal part S2. The beads 102 and 104 constitute a "first seal part." In contrast, as illustrated in FIG. 7D, when the first passage is closed, the bead 100 serves as the seal part S1 and the bead 106 serves as the seal part S2. The beads 100 and 106 constitute a "second seal part." In a state in which one of the first bead part and the second bead part is in close contact with the passage 16, the other of the first bead part and the second bead part is not in contact with the passage 16. As a result of limiting the part in close contact with the passage 16 to the bead parts in this manner, the squeeze rate of the elastic member 74 while the valve is closed can be minimized, and the shut-off torque of the valve element 18 can be reduced to a low value.

As illustrated in FIGS. 8A to 8E, the beads 102 and 104 are each sandwiched, over its entire length, by a bifurcated shape (corresponding to a "first bifurcated shape") of the first support part 81 and the third support part 85. The centers (seal centers) of the beads 102 and 104 are on center lines of the bifurcated shapes. The shapes and the positions of these beads are defined such that the beads touch the inner surface of the passage 16 substantially at the same time and the squeeze rates of the beads are substantially uniform when the second passage is closed. This minimizes the amount of squeeze of the elastic member 74 from when the second passage starts being closed until the second passage is completely shut. As a result, the shut-off torque of the valve element 18 while the second passage is closed can be reduced to a low value.

Similarly, the beads 100 and 106 are each sandwiched, over its entire length, by a bifurcated shape (corresponding to a "second bifurcated shape") of the first support part 81 and the second support part 83. The centers (seal centers) of the beads 100 and 106 are on center lines of the bifurcated shapes. The shapes and the positions of these beads are defined such that the beads touch the inner surface of the passage 16 substantially at the same time and the squeeze rates of the beads are substantially uniform when the first passage is closed. This minimizes the amount of squeeze of the elastic member 74 from when the first passage starts being closed until the first passage is completely shut. As a result, the shut-off torque of the valve element 18 while the first passage is closed can be reduced to a low value.

As illustrated in FIGS. 9A to 9D, the annular bead 96, the straight bead 108, and the arc-shaped bead 112 are in close contact with the flat surface 71 of the passage 16 whether the passage 16 is open or closed. Although not illustrated, the same applies to the straight bead 110 and the arc-shaped bead 114. As already described above, the arc-shaped beads 112 and 114 are in contact with the flat surface 71 at the outermost positions of the elastic member 74 in the radial direction from the axis of the valve element 18. Thus, regions of the valve element 18 causing operating torque (rotational resistance) when the valve is opened can be limited to the arc-shaped beads 112 and 114 and regions inside the arc-shaped beads 112 and 114. In addition, since the arc-shaped beads 112 and 114 and the annular bead 96 are concentric, the rotational resistance can be reduced to a small value. Regarding the straight beads 108 and 110, since one straight bead is provided in each direction along the radial direction, the straight beads 108 and 110 are also in approximately line contact with the flat surface 71 even in view of the squeeze amount. Thus, the area of contact with the flat surface 71 is small. This reduces the operation torque of the valve element 18 to a small value while achieving the sealing property of the valve element 18.

Similarly, the annular bead 98, the straight bead 116, and the arc-shaped bead 120 are in close contact with the flat surface 73 of the passage 16 whether the passage 16 is open or closed. Although not illustrated, the same applies to the straight bead 118 and the arc-shaped bead 122. As already described above, the arc-shaped beads 120 and 122 are in contact with the flat surface 73 at the outermost positions of the elastic member 74 in the radial direction from the axis of the valve element 18, and arc-shaped beads 120 and 122 and the annular bead 98 are concentric. Regarding the straight beads 116 and 118 as well, one straight bead is provided in each direction along the radial direction. This reduces the operating torque of the valve element 18 to a small value while achieving the sealing property of the valve element 18.

Furthermore, as illustrated in FIG. 9D, flange parts 130 and 132 protruding radially outward are formed near an upper end and a lower end, respectively, of the plate 72. The flange part 130 has a shape with the outer diameter gradually decreasing toward the upper end of the plate 72. Thus, an annular narrow portion P2 narrowing the gap between the plate 72 and the flat surface 71 is formed on the inner side of the annular bead 96. The annular narrow portion P2 has a "specific annular shape." Similarly, the flange part 132 has a shape with the outer diameter gradually decreasing toward the lower end of the plate 72. Thus, an annular narrow portion P2 narrowing the gap between the plate 72 and the flat surface 73 is formed on the inner side of the annular bead 98.

As a result, even if a differential pressure acts inward in the radial direction on side faces of the annular beads 96 and 98 on the higher-pressure side when the valve element 18 has become in the valve closed state, the gaps at the annular narrow portions P2 each function as a resistance restricting displacement of the annular seal part. In this case, the annular seal part being pressed toward the gap against the resistance increases its surface pressure, and exerts a self-sealing effect. Such a structure increases the sealing performance of the butterfly valve 10 while the valve is closed.

As described above, according to the present embodiment, the plate is structured such that the narrow region is formed on the lower-pressure side of the seal center of the seal part when the valve is closed. This achieves the object of securing sealing of the valve section under high-pressure fluid. Furthermore, the band-like seal parts (bead parts) are formed along the outer circumferential surface of the valve element and arranged to be capable of touching or leaving the passage substantially at the same time. This achieves the object of suppressing the shut-off torque of the valve element. Furthermore, the seal parts being always in contact with flat surfaces of the passages are only the annular seal part, the arc-shaped seal parts, and the straight seal parts connecting the arc-shaped seal parts with the annular seal part. This achieves the object of suppressing the operating torque of the valve element.

Second Embodiment

Figure 10A:
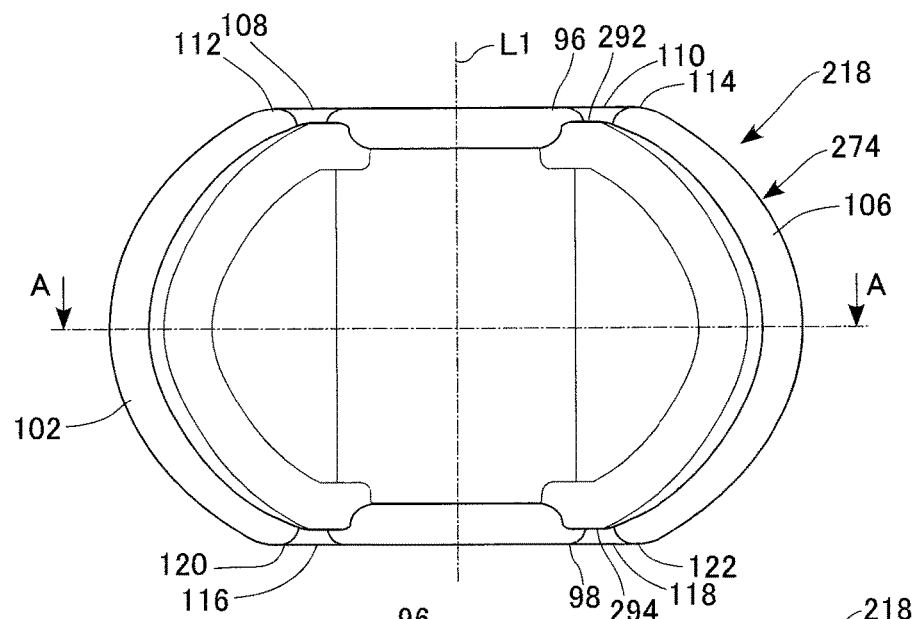
FIGS. 10A to 10C illustrate a structure of a valve element of a butterfly valve according to a second embodiment.
Figure 10B:
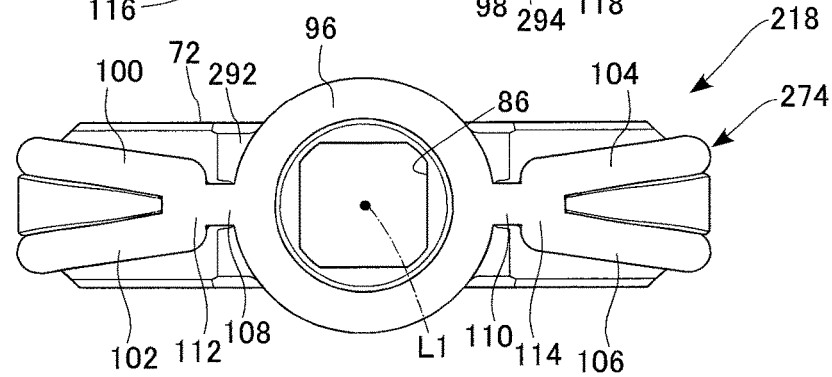
Figure 10C:
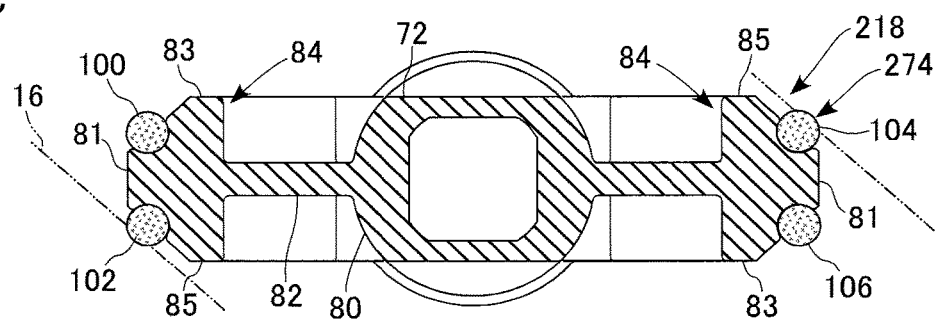

FIGS. 10A to 10C illustrate a structure of a valve element of a butterfly valve according to a second embodiment. FIG. 10A is a front view, FIG. 10B is a plan view, and FIG. 10C is a cross-sectional view along arrows A-A in FIG. 10A. The following description will be focused on the difference from the first embodiment. Note that, in FIGS. 10A to 10C, components and parts substantially the same as those in the first embodiment will be represented by the same reference numerals.

The present embodiment differs from the first embodiment in that an elastic member does not cover the entire outer surface of the plate but is constituted only by bead parts. Specifically, as illustrated in FIGS. 10A to 10C, a valve element 218 includes an elastic member 274 provided along an outer circumferential surface of the plate 72, and has a symmetric structure with respect to the axis L1. The elastic member 274 has such a structure in which the base part 75 is excluded from the elastic member 74 of the first embodiment but the seal part 77 remains. Specifically, the elastic member 274 is constituted by the annular bead 96, the straight bead 108, the arc-shaped bead 112, the beads 100 and 102, the arc-shaped bead 120, the straight bead 116, the annular bead 98, the straight bead 118, the arc-shaped bead 122, the beads 104 and 106, the arc-shaped bead 114, and the straight bead 110, which form a continuous structure.

An upper end face and a lower end face of the plate 72 are flat surfaces 292 and 294 perpendicular to the axis L1 and parallel to each other. The annular bead 96 is provided on the flat surface 292, and the annular bead 98 is provided on the flat surface 294. Similarly to the first embodiment, the annular bead 96, the straight beads 108 and 110, and the arc-shaped beads 112 and 114 are in close contact with the flat surface 71 of the passage 16 substantially at the same squeeze rate. Similarly, the annular bead 98, the straight beads 116 and 118, and the arc-shaped beads 120 and 122 are also in close contact with the flat surface 73 of the passage 16 at substantially the same squeeze rate.

According to the present embodiment, the same effects as those in the first embodiment are produced. In addition, since the elastic member 274 is provided on a minimum required area, the material cost is reduced.

The description of the present invention given above is based upon certain embodiments. The embodiments are intended to be illustrative only and it will be obvious to those skilled in the art that various modifications could be further developed within the technical idea underlying the present invention.

Figure 11:
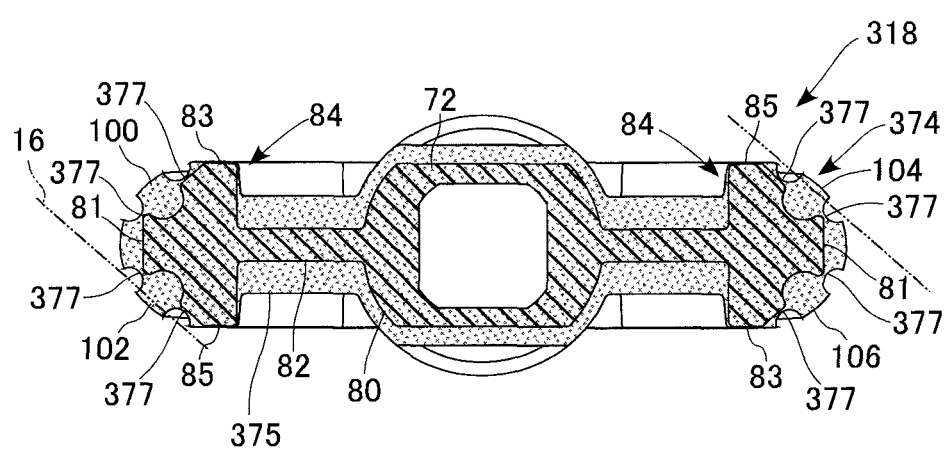
FIG. 11 is a cross-sectional view of a valve element according to a first modification.

FIG. 11 is a cross-sectional view of a valve element according to a first modification. In the first embodiment, as illustrated in FIGS. 6A to 6C, the structure in which the beads 100 to 106 are formed to protrude from the base part 75 that smoothly covers the plate 72 has been presented. In contrast, in the present modification, part of an elastic member 374 of a valve element 318 is cut out to form bead parts (seal parts). More specifically, beads 100 to 106 may be formed by formation of a plurality of grooves 377 having semicircular cross sections are formed on a base part 375 that smoothly covers the plate 72. The beads 100 to 106 are the same as those in the first embodiment in protruding from the plate 72 side. This structure also produces the same effects as those in the first embodiment.

Figure 12A:
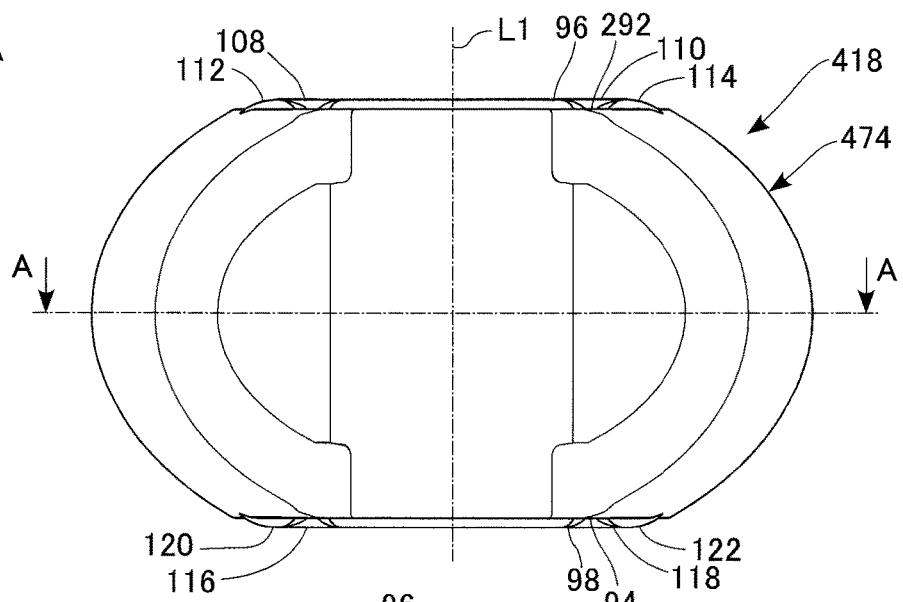
FIGS. 12A to 12C illustrate a structure of a valve element of a butterfly valve according to a second modification.
Figure 12B:
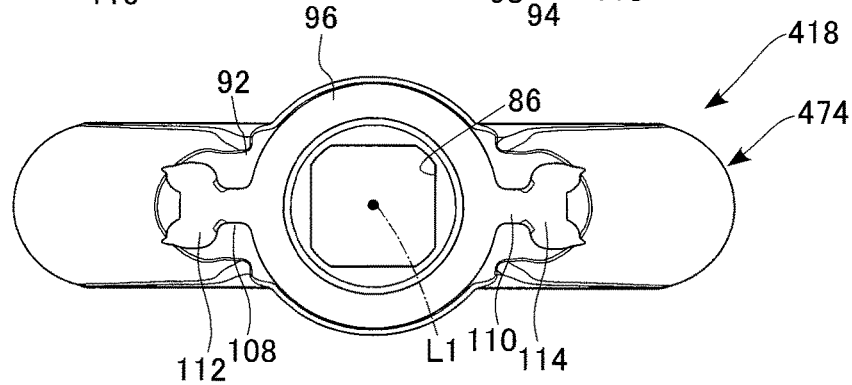
Figure 12C:
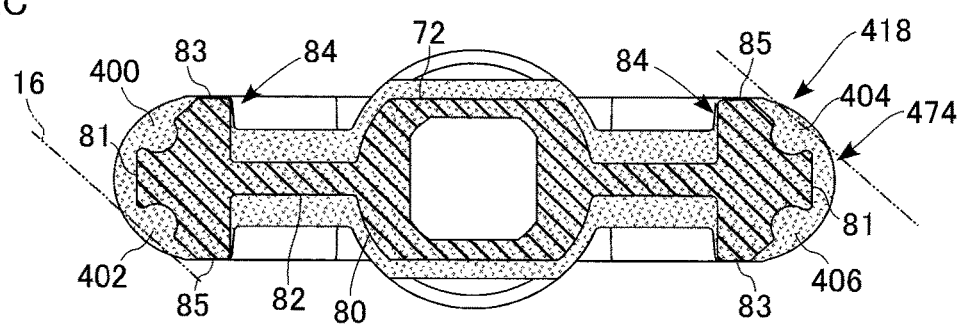

FIGS. 12A to 12C illustrate a structure of a valve element of a butterfly valve according to a second modification. FIG. 12A is a front view, FIG. 12B is a plan view, and FIG. 12C is a cross-sectional view along arrows A-A in FIG. 12A. In a valve element 418 of the present embodiment, an elastic member 474 does not include the beads 100 to 106 as in the first embodiment, but has smooth side faces. In such a structure as well, parts 400 to 406 sandwiched by bifurcated shapes of the seal support parts 84 function as the seal parts S1 and S2 (see FIGS. 7A and 7B). In this structure as well, narrow regions are formed on lower-pressure sides of seal centers of seal parts when the valve is closed, which produces the same effect as that in the first embodiment in terms of improvement in the sealing performance. Since, however, the seal part is not constituted by bead parts, the same torque reduction effect as that in the first embodiment cannot be produced.

Figure 13A:
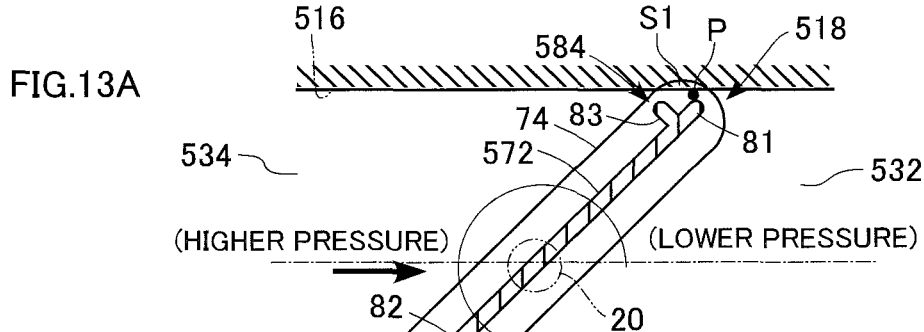
FIGS. 13A to 13C schematically illustrate sealing methods according to modifications.
Figure 13B:
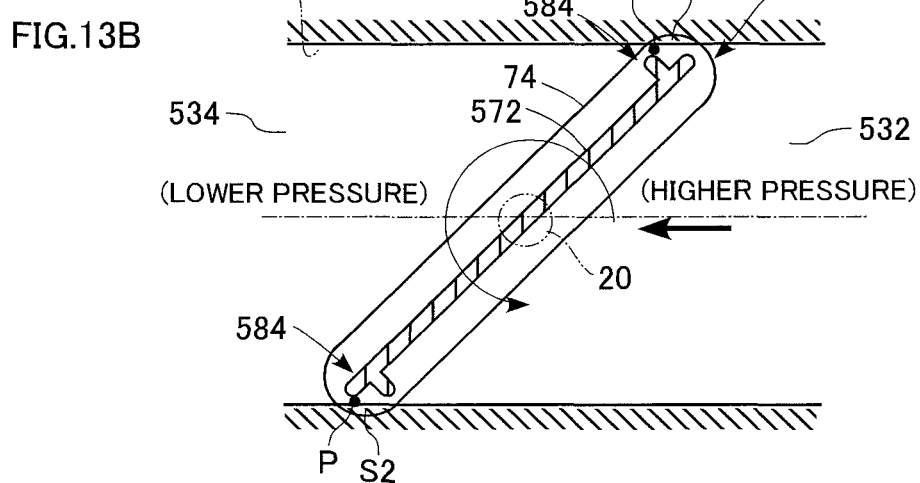
Figure 13C:
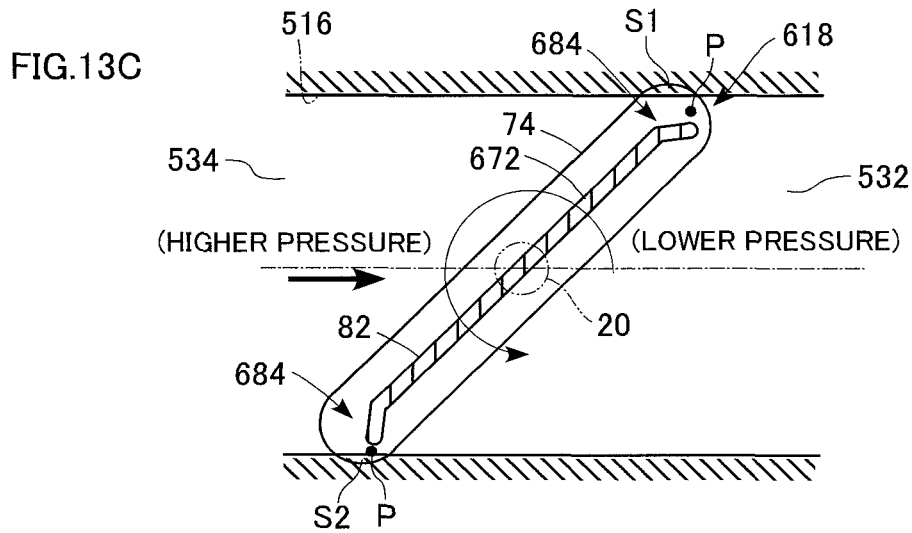

FIGS. 13A to 13C schematically illustrate sealing method according to modifications. FIGS. 13A and 13B illustrate a third modification, and FIG. 13C illustrates a fourth modification. In the embodiments described above, the example in which the seal support parts each have a trifurcated shape has been presented as a structure applicable to a so-called three-way valve as illustrated in FIGS. 7A and 7B.

In the third modification, a so-called two-way valve is intended, and a structure applicable to bidirectional flow in a passage 516 where the upstream side and the downstream side are switched will be presented. As illustrated in FIG. 13A, a plate 572 has specific shapes to narrow gaps between the plate 572 and an inner surface of the passage 516 on lower-pressure sides of seal centers of seal parts when the valve is closed. Specifically, seal support parts 584 each include a first support part 81 extending in the extending direction of the valve element body part 82, and a second support part 83 extending in one turning direction (valve closing direction) of the valve element 18 from the valve element body part 82.

With such a structure, as illustrated in FIG. 13A, when a port 534 side is higher in pressure while a port 532 side is lower in pressure in the valve closed state, a differential pressure in a self-closing direction acts on a seal part S1 on one side of the shaft 20 while a differential pressure in a self-opening direction acts on a seal part S2 on the other side of the shaft 20. Under such a condition as well, since a narrow region P is formed on a lower-pressure side of the seal center of the seal part S2, a self-sealing effect is exerted over the entire circumference of the valve element 518.

Furthermore, as illustrated in FIG. 13B, when the port 532 side is higher in pressure while the port 534 side is lower in pressure in the valve closed state, a differential pressure in the self-opening direction acts on the seal part S1 on one side of the shaft 20 while a differential pressure in the self-closing direction acts on the seal part S2 on the other side of the shaft 20. Under such a condition as well, since a narrow region P is formed on a lower-pressure side of the seal center of the seal part S1, a self-sealing effect is exerted over the entire circumference of the valve element 518. The present modification allows the shape of the plate to be simpler for a two-way valve than that of a three-way valve.

The fourth modification presents a structure applicable when the flow in a passage 516 is unidirectional. As illustrated in FIG. 13C, a plate 672 has specific shapes to narrow gaps between the plate 672 and an inner surface of the passage 516 on lower-pressure sides of seal centers of seal parts when the valve is closed. Specifically, seal support parts 684 each have a shape extending in such a manner as to be bent, near an end of the valve element body part 82, in a direction toward a downstream side with respect to the extending direction of the plate 672.

With such a structure, when a port 534 side is higher in pressure while the port 532 side is lower in pressure in the valve closed state, a differential pressure in a self-closing direction acts on a seal part S1 on one side of the shaft 20 while a differential pressure in a self-opening direction acts on a seal part S2 on the other side of the shaft 20. Under such a condition as well, since a narrow region P is formed on a lower-pressure side of the seal center of the seal part S2, a self-sealing effect is exerted over the entire circumference of the valve element 618.

While examples of the specific shapes depending on the flow direction in the passage have been presented above, any other "shape to narrow the gaps between the plate and the inner surface of the passage on lower-pressure sides of the seal centers of the seal parts" can be used. For example, when the flow in the passage 516 is unidirectional, the structure of the third modification (FIG. 13A, etc.) may be used. The structures of the first and second embodiments (FIG. 7A, etc.) may be used for a two-way valve.

Figure 14A:
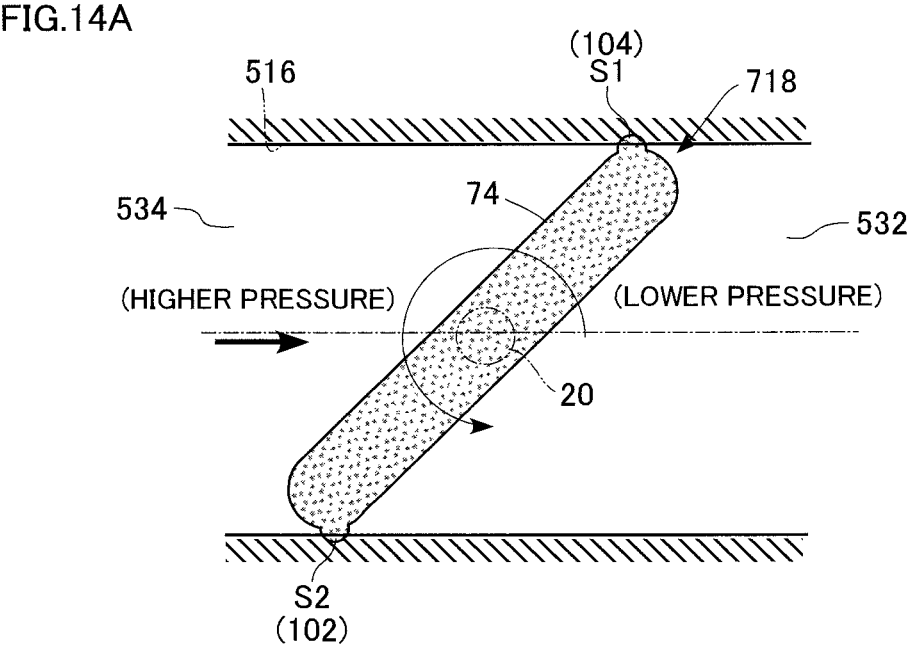
FIGS. 14A and 14B schematically illustrate a torque reduction method according to a modification.
Figure 14B:
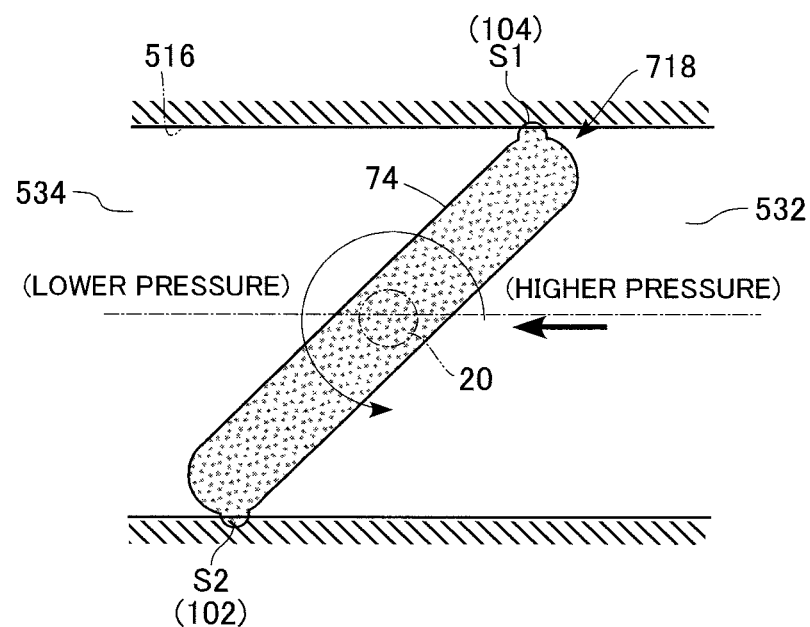

FIGS. 14A and 14B schematically illustrate a torque reduction method according to a modification. In the embodiments described above, as illustrated in FIGS. 7C and 7D, the structure including the first bead part constituted by the beads 102 and 104 and the second bead part constituted by the beads 100 and 106 has been presented as a structure applicable to a so-called three-way valve.

In the present modification, a so-called two-way valve is intended. A valve element 718 has a structure in which the second bead part constituted by the beads 100 and 106 is excluded from the valve element 18 of the first embodiment. With such a structure, as illustrated in FIG. 14A, when a port 534 side is higher in pressure while a port 532 side is lower in pressure in the valve closed state, the bead 104 serves as the seal part S1 and the bead 102 serves as the seal part S2. In addition, as illustrated in FIG. 14B, when the port 532 side is higher in pressure while the port 534 side is lower in pressure in the valve closed state as well, the bead 104 serves as the seal part S1 and the bead 102 serves as the seal part S2. This structure maintains the effect of reducing the shut-off torque of the valve element 718 to a low value and reduces the manufacturing cost of the elastic member coming in contact with the passage 516. Note that the structure of the present modification is also applicable to a case where the flow in the passage 516 is unidirectional.

In the embodiments described above, the structure in which the angle of the valve element with respect to the axis of the passage while the valve is closed is set to 45 degrees and the valve element obliquely seals the passage has been presented. In a modification, other appropriate angles may be used for the angle of the valve element. The angle of the valve element may be 90 degrees, but is preferably smaller than 90 degrees. At the angle of 90 degrees, differential pressures act on the valve element in a self-opening direction on both sides of the shaft, which is disadvantageous in terms of stabilization of sealing performance. At an angle smaller than 90 degrees, a differential pressure acts on a self-closing direction on one side of the shaft, which relatively stabilizes the sealing performance. Furthermore, since the seal part on the self-closing side has a stopper function stopping the turning of the valve element, the seal part itself can be made smaller. This reduces the squeeze rate of the seal part, and may reduce the shut-off torque.

While the body 12 is made of metal in the embodiments described above, the body 12 may be made of plastic or other materials. In addition, while the plate of the valve element is made of metal in the embodiments described above, the plate may be made of plastic or other materials. Note that a material harder than the elastic member is selected.

In the embodiments described above, as illustrated in FIGS. 4A and 4B, etc., the plate 72 is formed through integral molding of a metal material. Although not mentioned in the embodiments above, the plate 72 may be formed through injection molding of a metal material (such as metal powder injection molding), forging, die casting, or the like. In a modification, a plurality of plates (first plate and second plate) may be provided and connected.

Figure 15A:
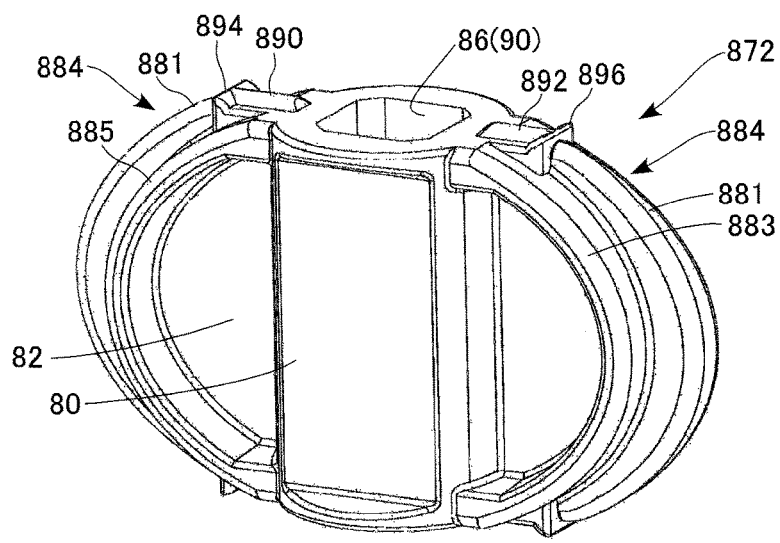
FIGS. 15A to 15C illustrate a structure of a plate according to a modification.
Figure 15B:
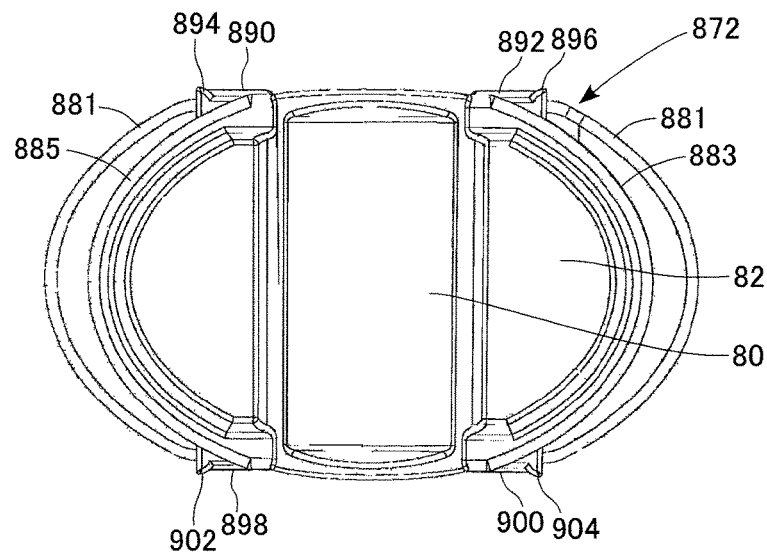
Figure 15C:
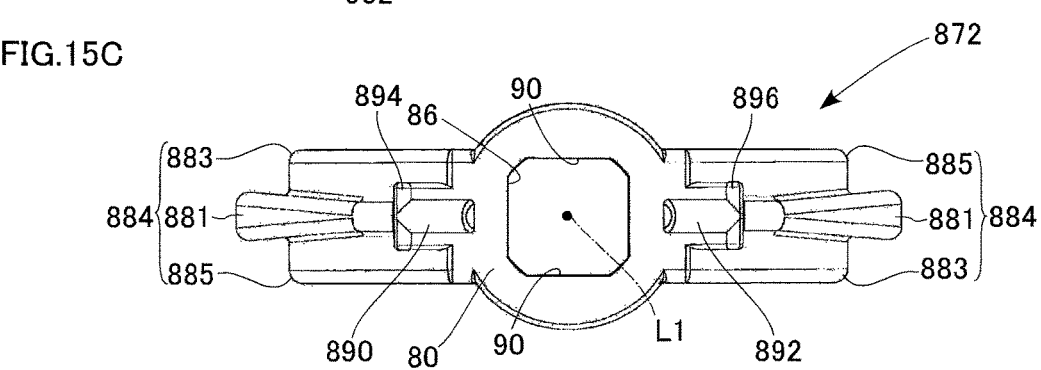

FIGS. 15A to 15C illustrate a structure of a plate according to a modification. A plate 872 may be used instead of the plate 72 in the embodiments described above. The plate 872 includes a base 80, valve element body parts 82 and seal support parts 884. The seal support parts 884 have a trifurcated shape in cross section similarly to the embodiments above, and each include a first support part 881 extending in the extending direction of the valve element body part 82, a second support part 883 extending in one turning direction of the valve element from the valve element body part 82, and a third support part 885 extending in the other turning direction of the valve element from the valve element body part 82.

On upper faces of the base 80 and the valve element body parts 82, fourth support parts 890 and 892 are provided at positions corresponding to the straight beads 108 and 110, respectively, of the elastic member 74 (see FIGS. 6A to 6C), and fifth support parts 894 and 896 are provided at positions corresponding to the arc-shaped beads 112 and 114, respectively. The fourth support parts 890 and 892 are positioned on extensions in the circumferential direction of the pair of the first support parts 881. The fourth support part 890 orthogonally intersects the fifth support part 894, and the fourth support part 892 orthogonally intersects the fifth support part 896. The fourth support parts 890 and 892 have shapes to narrow the gaps between the plate 872 and the flat surface 71 (see FIGS. 2A and 2B) near the seal centers of the straight beads 108 and 110, respectively (preferably on lower-pressure sides of the seal centers). The fifth support parts 894 and 896 have shapes to narrow the gaps between the plate 872 and the flat surface 71 on the lower-pressure sides of the seal centers of the arc-shaped beads 112 and 114, respectively.

Similarly, on lower faces of the valve element body parts 82, sixth support parts 898 and 900 are provided at positions corresponding to the straight beads 116 and 118, respectively, of the elastic member 74, and seventh support parts 902 and 904 are provided at position corresponding to the arc-shaped beads 120 and 122, respectively. The sixth support parts 898 and 900 are positions on extensions in the circumferential direction of the pair of first support parts 881. The sixth support part 898 orthogonally intersects the seventh support part 902, and the sixth support part 900 orthogonally intersects the seventh support part 904. The sixth support parts 898 and 900 have shapes to narrow the gaps between the plate 872 and the flat surface 73 (see FIGS. 2A and 2B) near the seal centers of the straight beads 116 and 118, respectively (preferably on lower-pressure sides of the seal centers). The seventh support parts 902 and 904 have shapes to narrow the gaps between the plate 872 and the flat surface 73 on the lower-pressure sides of the seal centers of the arc-shaped beads 120 and 122, respectively.

Note that the positions of the fourth support parts 890 and 892 may be largely shifted in the width direction of the plate 872 from the positions shown in FIG. 15C. This preferably allows the fourth support parts 890 and 892 to narrow the gaps between the plate 872 and the flat surface 71 on the lower-pressure sides of the seal centers of the straight beads 108 and 110, respectively. Similarly, the positions of the sixth support parts 898 and 900 may be largely shifted in the width direction of the plate 872. This preferably allows the sixth support parts 898 and 900 to narrow the gaps between the plate 872 and the flat surface 73 on the lower-pressure sides of the seal centers of the straight beads 116 and 118, respectively.

Although not mentioned in the embodiments and modifications above, the annular beads may each include a plurality of annular beads, such as double annular beads or triple annular beads.

Although not mentioned in the embodiments and modifications above, a structure in which the shaft does not extend through the valve element may be used. Specifically, in the structure illustrated in FIGS. 2A and 2B, a leading end of the shaft 20 may be positioned inside the valve element 18. In this case, the shaft support hole 38 can be omitted.

In the embodiments described above, the examples in which the butterfly valve is applied to a refrigeration cycle of an automotive air conditioner have been presented. In a modification, the butterfly valve may be applied to a refrigeration cycle of a home air conditioner or other air conditioners. Alternatively, the butterfly valve may be applied to a circulation circuit of an automotive coolant (cooling water or cooling oil) for cooling a battery or a motor, or the like. In other words, the butterfly valve may be applied to a fluid circuit of an automotive fluid control system. Alternatively, the butterfly valve may be applied to a water circuit of a water heater or the like. Still alternatively, the butterfly valve may be applied to a device for controlling flow of working fluid such as oil.

In the embodiments described above, the T-shaped passage having two passages arranged coaxially and another passage orthogonally intersecting the two passages is presented as a fluid passage having three openings. In a modification, a structure in which three passages are arranged in parallel and communication passages or holes connecting the three passages are provided may be used, for example. One passage opening in one direction may be arranged between the other two passages opening in the opposite direction, and communication holes may be formed through partitions between the passages adjacent to each other, for example. In addition, the structures of the butterfly valve are applicable to various shapes of flow passages.

The present invention is not limited to the above-described embodiments and modifications only, and the components may be further modified to arrive at various other embodiments without departing from the scope of the invention. Various other embodiments may be further formed by combining, as appropriate, a plurality of structural components disclosed in the above-described embodiments and modifications. Furthermore, one or some of all the components exemplified in the above-described embodiments and modifications may be left unused or removed.

What is claimed is:

1. A butterfly valve that is motor-operated, comprising:
a body having a passage through which a fluid passes;
a shaft supported by the body such that the shaft is rotatable about its axis, and extending in a radial direction of the passage;
a valve element disposed in the passage in a state where the valve element and the shaft are assembled, and configured to turn with the shaft to control open/closed states of the passage or adjust an opening degree of the passage; and
an actuator configured to drive the shaft to rotate when power is supplied,
wherein the valve element includes a plate, and an elastic member provided along an outer circumference of the plate,
wherein the elastic member has seal parts that touch and leave an inner surface of the passage to close and open the passage,
wherein the plate has specific shapes on both sides with respect to an axis of the shaft, the specific shapes narrowing gaps between the plate and the inner surface of the passage on lower-pressure sides of seal centers of the seal parts in a valve closed state,
wherein the specific shapes of the plate are shapes having bent portions along directions deviated from an extending direction of the plate,
wherein the elastic member include a first seal part to close a second passage when the valve element is turned in a first direction, and a second seal part to close a first passage when the valve element is turned in a second direction, and
wherein the specific shapes of the plate include a first bifurcated shape sandwiching the first seal part and a second bifurcated shape sandwiching the second seal part.

2. The butterfly valve according to claim 1,
wherein the shaft is inserted through an insertion hole being formed in the body and being open at the passage,
wherein the elastic member has an annular seal part surrounding an opening of the insertion hole and being in close contact with the inner surface of the passage,
wherein the contact between the annular seal part and the passage always provides sealing between the passage and the insertion hole whether the passage is open or closed, and
wherein the plate has a specific annular shape to narrow a gap between the plate and the inner surface of the passage on an inner side in a radial direction of the annular seal part whether the passage is open or closed.

3. The butterfly valve according to claim 1,
wherein the seal parts include bead parts protruding from the plate side toward the inner surface of the passage and extending along the outer circumference.

4. The butterfly valve according to claim 1,
wherein the valve element touches the passage at an angle smaller than 90 degrees with respect to an axis of the passage.

5. The butterfly valve according to claim 1, installed in an automotive fluid control system and functioning as a control valve to control flow of a fluid.

6. The butterfly valve according to claim 2, wherein the seal parts include bead parts protruding from the plate side toward the inner surface of the passage and extending along the outer circumference.

* * * * *